United States Patent [19]

Edwards

[11] Patent Number: 4,651,592
[45] Date of Patent: Mar. 24, 1987

[54] INFINITELY VARIABLE SPEED DRIVE WITH DIFFERENTIAL HAVING TWO INPUT SHAFTS AND AN OUTPUT GEAR

[75] Inventor: Douglas F. Edwards, Mt. Vernon, Ohio

[73] Assignee: The J. B. Foote Foundry Co., Fredericktown, Ohio

[21] Appl. No.: 724,561

[22] Filed: Apr. 18, 1985

[51] Int. Cl.[4] ............................................. F16H 37/00
[52] U.S. Cl. ......................................... 74/689; 74/705
[58] Field of Search ................................. 74/689, 705

[56] References Cited

U.S. PATENT DOCUMENTS

| 3,257,867 | 6/1966 | Dennick | 74/689 |
| 3,340,749 | 9/1967 | Magg et al. | 74/689 |
| 3,370,485 | 2/1968 | Carawan | 74/689 |
| 3,924,480 | 12/1975 | Carapellucci | 74/689 |

FOREIGN PATENT DOCUMENTS

| 174285 | 3/1953 | Austria | 74/689 |
| 1112364 | 8/1961 | Fed. Rep. of Germany | 74/689 |
| 325736 | 5/1903 | France | 74/689 |
| 353098 | 10/1937 | Italy | 74/689 |
| 6850 | of 1915 | United Kingdom | 74/689 |

Primary Examiner—Leslie Braun
Assistant Examiner—D. Wright
Attorney, Agent, or Firm—Allen D. Gutchess, Jr.

[57] ABSTRACT

An infinitely variable speed drive is provided which is entirely mechanical, rather than hydraulic. The drive includes a rotatable housing having an output gear or sprocket rotatable therewith. An idler shaft is carried in the housing perpendicular to an axis of rotation thereof with first and second bevel gears rotatably mounted on the shaft. First and second shafts extend into the housing on the axis of rotation and in alignment with one another. Third and fourth bevel gears are affixed to the first and second shafts in the housing and mesh with the first and second bevel gears on the idler shaft. First drive gears rotate the first shaft at a constant speed in one direction. Second drive gears rotate the second shaft at different variable speeds in a direction opposite to the direction of rotation of the first shaft to cause the housing to rotate and drive the gear or sprocket thereon at infinitely variable speeds. A variable speed pulley arrangement can be used to drive the first and second drive gears.

9 Claims, 5 Drawing Figures

INFINITELY VARIABLE SPEED DRIVE WITH DIFFERENTIAL HAVING TWO INPUT SHAFTS AND AN OUTPUT GEAR

This invention relates to a mechanical infinitely variable speed drive, particularly with reverse actuation.

Infinitely variable speed drives heretofore known have been of the hydraulic type which are prohibitively expensive for many applications, such as small riding mowers, snow blowers, etc. The present invention provides a mechanical infinitely variable speed drive which has most of the advantages of a hydraulic drive without the high costs. The new drive enables infinite variation in speed without reducing engine speed and enables one actuating lever to achieve infinitely variable speed and forward-reverse actuation. The mechanical drive includes a rotatable support housing having an output gear or sprocket mounted thereon in a position to rotate in a plane perpendicular to the axis of rotation of the housing. An idler shaft is rotatably supported in the housing perpendicular to the axis of rotation of the housing with first and second bevel gears rotatably mounted on end portions of the idler shaft. A first drive shaft extends into the housing on the axis of rotation and a second drive shaft extends into the opposite side of the housing, also on the axis of rotation and being aligned with the first drive shaft. A third level gear is affixed to the first drive shaft in the housing and meshes with both of the first and second gears. A fourth level gear is affixed to the second shaft in the housing and also meshes with the first and second bevel gears.

In accordance with the invention, a first mechanical drive is employed to rotate the first shaft in one direction at a substantially constant speed and a second mechanical drive is employed to rotate the second drive shaft in a direction opposite to the direction of rotation of the first drive shaft and at infinitely variable speeds. This arrangement causes the housing and the output gear or sprocket to rotate at a speed equal to one-half the difference between the rotational speeds of the first and second drive shafts and in the direction of the drive shaft rotated at the higher speed. The gear or sprocket rotated along with the housing can be used to drive a variety of components. It can be used to drive a ring gear on a differential having axles connected to wheels of a small vehicle such as a riding lawn mower, garden tractor, golf cart, snowmobile, snow blower, garden tiller, and the like. The variable speed drive can also be used for many other applications not necessarily associated with small vehicles.

It is, therefore, a principal object of the invention to provide a variable speed drive entirely utilizing mechanical components.

Another object of the invention is to provide a mechanical infinitely variable speed drive having lower costs than hydraulic variable speed drives heretofore known.

Many other objects and advantages of the invention will be apparent from the following detailed description of preferred embodiments thereof, reference being made to the accompanying drawings, in which.

Figure 1:
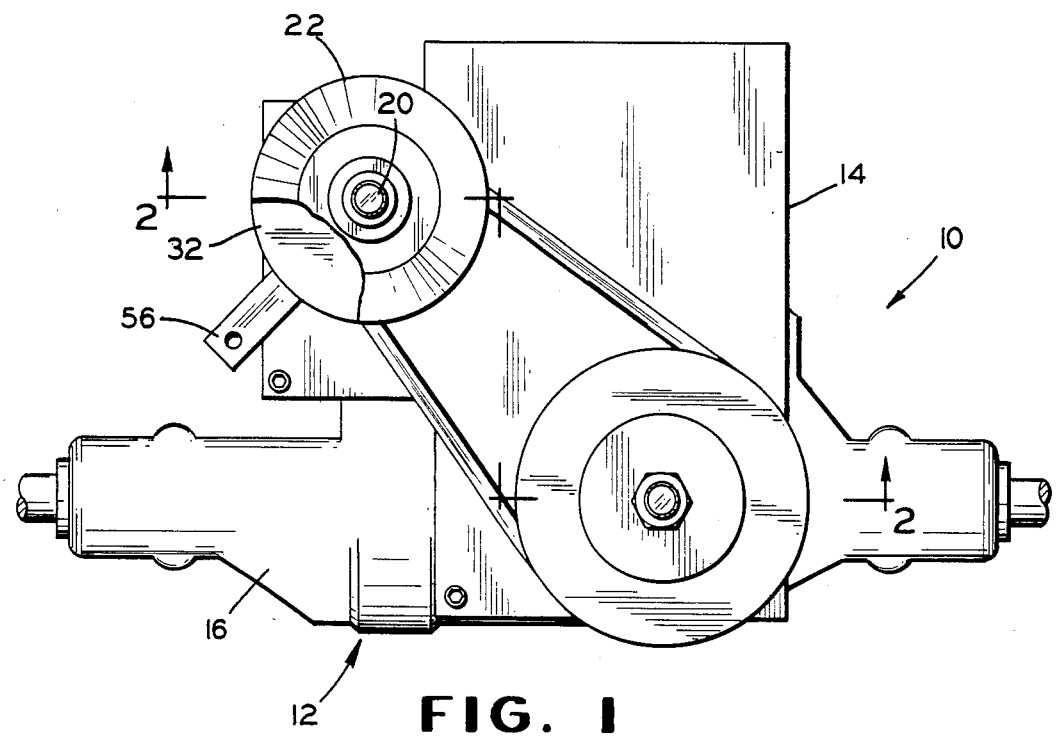
FIG. 1 is a somewhat schematic plan view of a variable speed drive in accordance with the invention.
Figure 4:
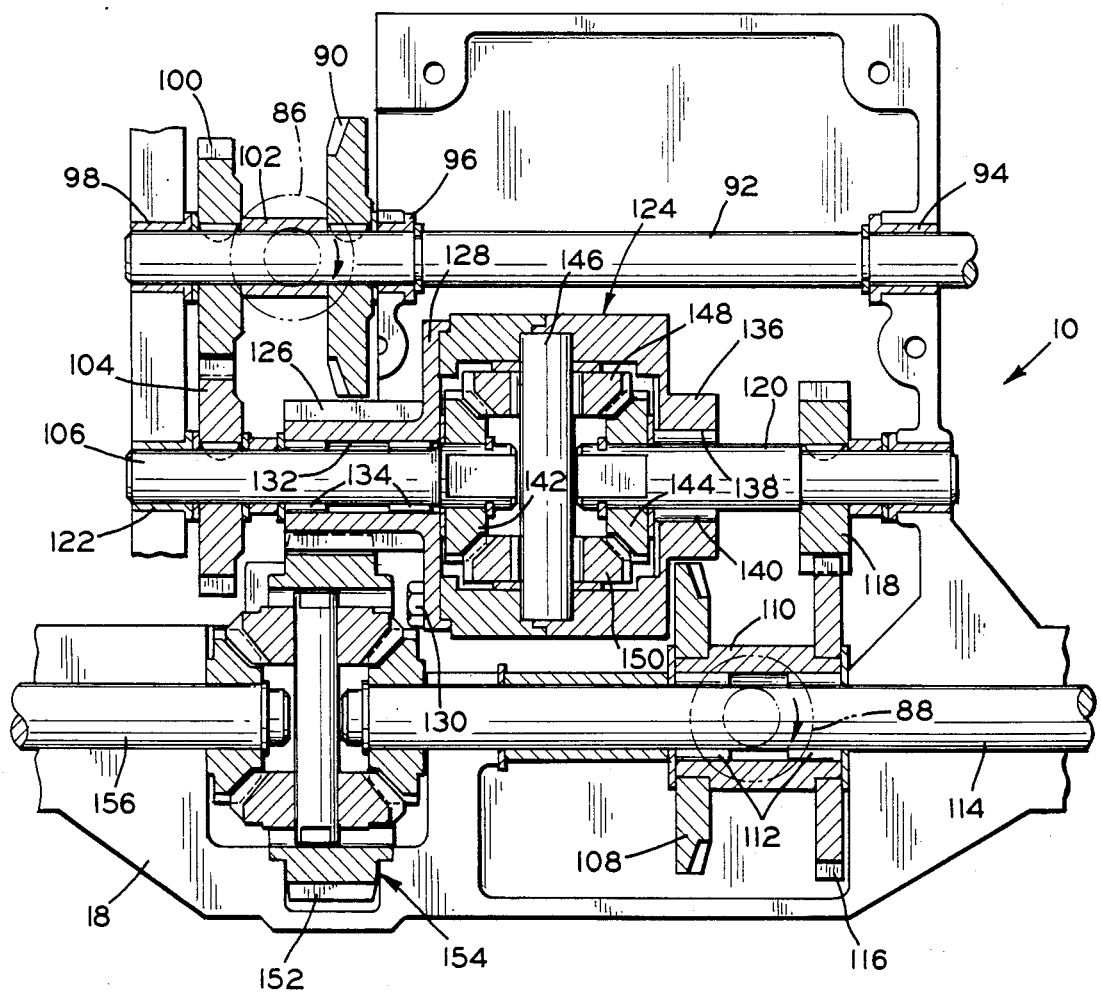
FIG. 4 is a plan view, with an upper housing part removed, and with components in section, of the variable speed drive shown in FIG. 1.

Referring to FIG. 1, a variable speed drive in accordance with the invention is indicated at 10 and includes a transaxle housing 12 on which a supporting plate 14 is mounted. The housing 12 includes an upper part 16 and a mating lower part 18 (FIG. 4).

Figure 2:
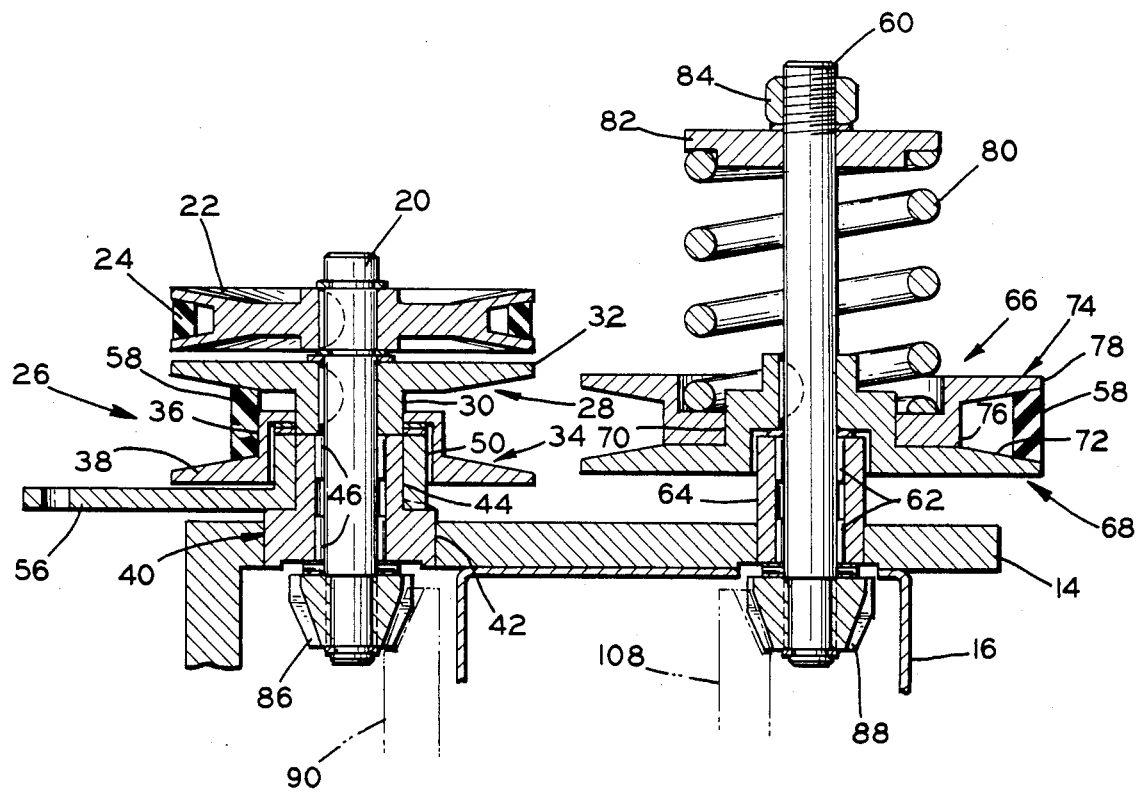
FIG. 2 is a view in vertical section taken along the line 2—2 of FIG. 1.

Referring more particularly to FIG. 2, a first, drive pulley shaft 20 has an upper drive pulley 22 mounted thereon, the pulley being connected by a belt 24 to an engine of a riding mower, for example, to drive the pulley 22 and the shaft 20. A first variable speed pulley 26 is located on the shaft 20 below the drive pulley 22. The pulley 26 has a fixed pulley part 28 including a hub 30 and a tapered flange 32 keyed to and rotatable with the shaft 20. The pulley 26 also has a movable pulley part 34 including a larger hub 36 and a tapered flange 38. The movable pulley part 34 is slidably mounted on the hub 30 of the fixed pulley part 28 and can move toward and away from the pulley part 28.

A fixed cam member 40 has a large hub 42 suitably affixed to and supported by the supporting plate 14 and a smaller hub 44 extending upwardly from the hub 42 and rotatably supporting the drive shaft 20 through bearings 46. The fixed cam member 40 has two upwardly extending ramps 48 (FIG. 3), each extending through an arc of 180°, located on the large hub 42. A movable cam member 50 extends into a recess 52 of the pulley hub 36 and has two ramps 54 facing the ramps 48, each also extending through an arc of 180°. A crank arm 56 extends outwardly from the movable cam member 50 and can be moved by any suitable remote control to rotate the cam member 50 relative to the fixed cam member 40.

Figure 3:
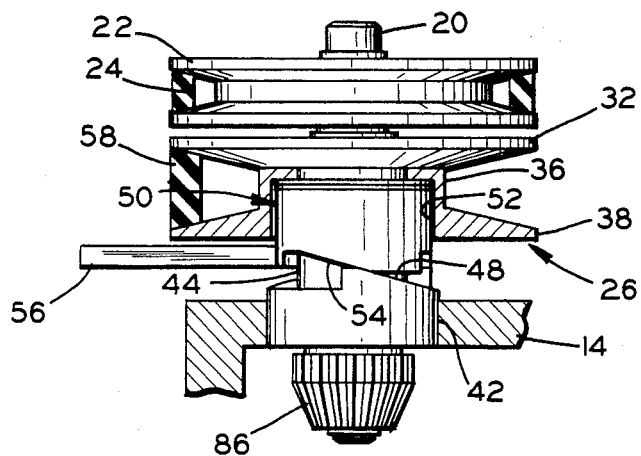
FIG. 3 is a view in elevation, with parts in section, of a component shown in FIG. 2.

With the ramps of the cam members 40 and 50 fully nesting, the pulley flanges 32 and 38 are in their maximum spaced position, as shown in FIG. 2, with a pulley belt 58 located adjacent the pulley hub 36. With the ramps 48 and 54 having outermost portions in engagement, as shown in FIG. 3. the pulley flanges 32 and 38 are in their closest positions with the pulley belt 58 near the extremities of the pulley flanges 32 and 38.

A second, driven pulley shaft 60 (FIG. 2) is rotatably supported by bearings 62 in a hub 64 which is suitably affixed in the plate 14. A driven variable speed pulley 66 is located on the shaft 60 and includes a fixed pulley part 68 having a hub 70 and a tapered flange 72, the hub 70 rotating with the shaft 60. A movable pulley part 74 includes a hub 76 located around the hub 70 and a tapered flange 78. The movable pulley part 74 is urged toward the fixed pulley part 68 by a coil spring 80 having one end seated against the hub 76 and the other end seated against a ring 82, which is backed up by a nut 84 on the shaft 60.

A first drive bevel gear 86 is affixed to the lower end of the first drive shaft 20 and rotates at a constant speed with the shaft. A second drive bevel gear 88 (FIG. 2) is similarly located at the lower end of the second pulley shaft and rotates therewith.

The speed of the shaft 60 infinitely varies over a range of speeds as determined by the variable speed pulleys 26 and 66. The rotational speed of the bevel gear 88 and the shaft 60 will be slowest when the variable speed pulley 26 is in its most widely spaced condition, as shown in FIG. 2, at which time the pulley belt 58 will be near the extremities of the flanges 72 and 78 of the driven variable speed pulley 66. The speed of the bevel gear 88 and the shaft 60 will be fastest when the drive variable speed pulley 26 is in its closest position, as shown in FIG. 3. At that time, the belt 58 is at the extremities of the pulley flanges 32 and 38. This will move the belt 58 inwardly on the variable speed pulley 66 near the hub 76, forcing the movable pulley part 74 upwardly against the force of the spring 80, at which time the pulley 66 will assume its most widely spaced condition (not shown).

Referring more particularly to FIG. 4, the variable speed drive 10 is basically made of components found in commercially available transaxles. The constant speed drive bevel gear 86 is engaged with a first driven bevel gear 90 which is affixed to a first input shaft 92. This shaft is rotatably supported by the transmission housing 12 and supporting plate 14 by bushings 94, 96, and 98. A drive spur gear 100, which is also affixed to the shaft 92 and spaced from the gear 90 by a spacer 102, is rotated with the bevel gear 90. The spur gear 100 meshes with and drives a first driven spur gear 104 which is affixed to a first drive shaft 106.

The variable speed drive bevel gear 88 meshes with and rotates a second driven bevel gear 108. The bevel gear 108 rotates in a direction opposite to the direction of rotation of the first driven bevel gear 90 since the drive bevel gear 88 is located on the side of the gear 108 opposite to the positions of the first drive bevel gear 86 and the first driven bevel gear 90. The bevel gear 108 is affixed to a collar 110 which is rotatably mounted by bearings 112 on a first output shaft or axle 114. A second drive spur gear 116 is also affixed to the collar 110 and rotates at the same speed as the bevel gear 108. The drive spur gear 116 meshes with and rotates a second driven spur gear 118 which is located on a second drive shaft 120. This shaft is driven in a direction opposite to the direction of rotation of the first drive shaft 106.

An outer end of the first drive shaft 106 is rotatably supported in a bushing 122 and the inner end extends into a differential support housing or member 124 which can be made in two parts for assembly purposes and is of generally cylindrical shape. An output gear or toothed member 126 has a flange 128 affixed to a side of the housing 124 by bolts 130. The gear 126 has a bore 132 through which the first drive shaft 106 extends, with spaced roller bearings 134 between the bore and the shaft. The housing 124 also has a hub 136 on the side opposite the output gear 126, with the hub having a bore 138 through which the second drive shaft 120 extends, with roller bearings 140 therebetween.

Within the housing 124, a first miter or bevel gear 142 is affixed to an end of the shaft 106 and a second miter or bevel gear 144 is affixed to an end of the second drive shaft 120. An idler shaft 146 is positioned transversely in recesses of the housing 124 in a position perpendicular to the axes of the shafts 106 and 120 and the axis of rotation of the housing. Third and fourth miter or bevel gears 148 and 150 are rotatably mounted on end portions of the idler shaft 146 and mesh with the first and second miter gears 142 and 144.

With the above arrangement, the housing 124 and the output gear 126 rotate at a speed equal to one-half the difference between the rotational speeds of the first and second drive shafts 106 and 120 and in the same direction as the drive shaft which is rotated at the higher speed. For example, the first drive shaft 106 can rotate at a constant speed of 300 rpm in a counterclockwise direction, as viewed from the left side of the variable speed drive of FIG. 4. The second drive shaft 120 can be driven at a speed between 200 and 400 rpm in a clockwise direction, as viewed from the left side of the variable speed drive of FIG. 4. The rotation of the housing 124 and the output gear 126 will then vary from fifty rpm in one direction to fifty rpm in the other direction with the speed being zero when the rotational speeds of the shafts 106 and 120 are equal but rotating in opposite directions.

The second drive shaft can also be driven at speeds from 300 to 600 rpm, for example, in which case the output gear 126 rotates at a speed from zero to 150 rpm in one direction.

In the particular application shown, the output gear 126 meshes with a ring gear 152 on a differential 154 which drives the output shaft or axle 114 and a second output shaft or axle 156, which can be connected to driven wheels of a small vehicle, by way of example. A disconnection can be used in the drive train between the output gear 126 and the wheels so that the vehicle can be pushed or can coast when the engine is stopped. The differential 154 can be of the type shown in U.S. Pat. No. 4,232,569, issued Nov. 11, 1980, and will not be discussed in detail. Of course, the output gear 126 can be used with many other applications, wherever a mechanical, infinitely variable speed drive is needed or desirable.

Figure 5:
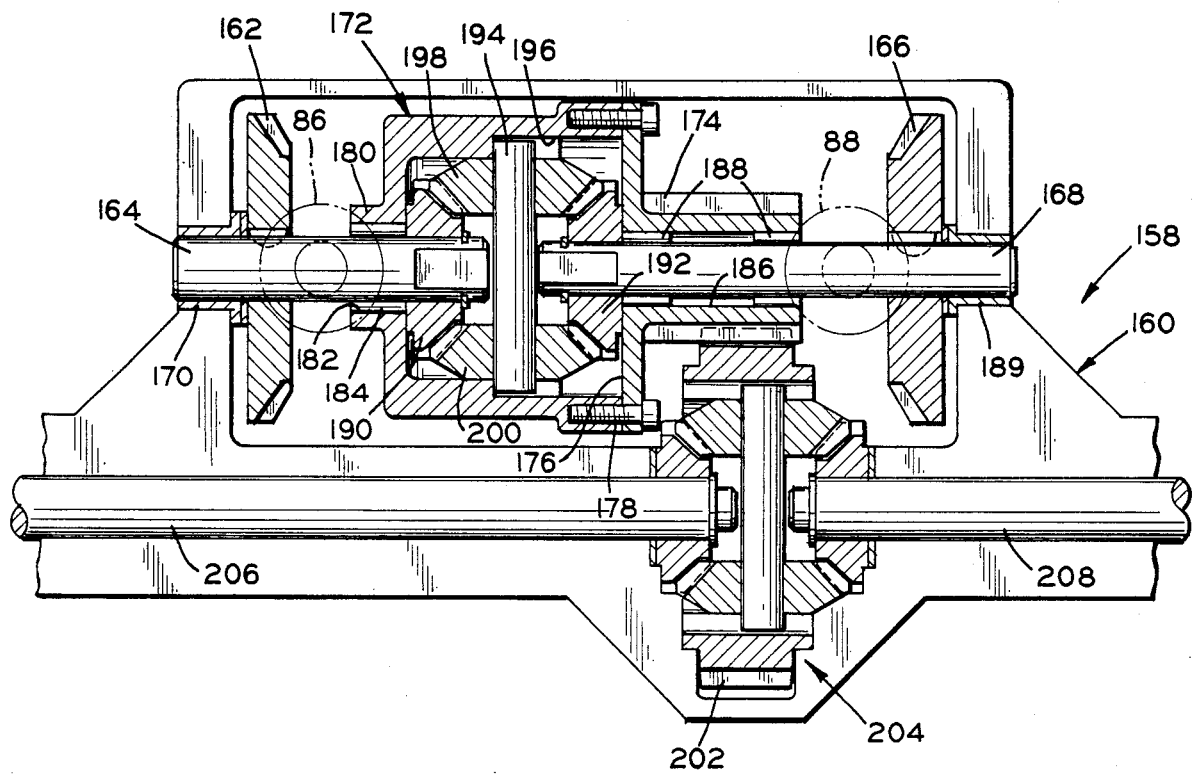
FIG. 5 is a plan view similar to FIG. 4, of a preferred embodiment of the variable speed drive.

A simplified mechanical variable speed drive in accordance with the invention is indicated at 158 in FIG. 5. The drive 158 includes a specially designed housing 160 into which extend the constant and variable speed bevel drive gears 86 and 88. The constant speed drive gear 86 meshes with a first driven bevel gear 162 which is affixed to a first drive shaft 164. The variable speed drive gear 88 meshes with a second driven bevel gear 166 which is affixed to a second drive shaft 168. Since the drive bevel gears 86 and 88 rotate in the same direction, the shafts 164 and 168 rotate in opposite directions due to the opposite positions of the driven bevel gears 162 and 166 relative to their respective drive gears.

As outer end of the first drive shaft 164 is rotatably supported in a bushing 170 and the inner end extends into a differential support housing or member 172 which, in this instance, is of one-piece construction but again having an outer generally cylindrical shape. An output gear or toothed member 174 has a flange 176 affixed to the periphery of one side of the housing 172 by bolts 178 and also encloses that side of the housing. The housing 172 also has a hub 180 at the other side, opposite the output gear 174, with the hub having a bore 182 through which the first drive shaft 164 extends, with roller bearings 184 therebetween. The output gear 174 also has a bore 186 therein through which the second drive shaft 168 extends, with spaced roller bearings 188 therebetween. An outer end of the second drive shaft 168 is rotatably supported in a bushing 189 by the housing 160.

Within the housing 172, a first miter or bevel gear 190 is affixed to an end of the shaft 164 and a second miter or bevel gear 192 is affixed to an end of the second drive shaft 168. An idler shaft 194 is received in diametrically opposite grooves 196 in the housing 172 and positioned transversely perpendicular to the axes of the shafts 164 and 168 and the axis of rotation of the housing 172. Third and fourth miter or bevel gears 198 and 200 are rotatably mounted on end portions of the idler shaft 194 and mesh with the first and second miter gears 190 and 192.

With the above arrangement, the support housing 172 is operated in the same manner as the support housing 124. However, the number of shafts and components are substantially reduced. In the application of FIG. 5, the output gear 174 meshes with a ring gear 202 on a differential 204 which drives output shafts or axles 206 and 208. These can be connected to driven wheels of a small vehicle similarly to the axles 114 and 156 of FIG. 4. The differential 204 can be similar to that of FIG. 4 and the aforesaid U.S. Patent. Again, the output gear 174 can be used with many other applications for driving a variety of components.

Various modifications of the above-described embodiments of the invention will be apparent to those skilled in the art and it is to be understood that such modifications can be made without departing from the scope of the invention, if they are within the spirit and the tenor of the accompanying claims.

I claim:

1. A variable speed transmission comprising a transmission housing, a first differential in said housing comprising a first differential housing, a first drive shaft extending into an end of said differential housing and having a spaced portion rotatably carried by said transmission housing, a second drive shaft aligned with said first drive shaft, extending into an opposite end of said differential housing, and having a spaced portion rotatably carried by said transmission housing, a toothed member affixed to said differential housing perpendicular to said first and second drive shafts and rotatable with said differential housing, a first driven bevel gear mounted on said first drive shaft, a first drive bevel gear meshing with said first driven bevel gear for rotating said first shaft at a substantially constant speed in one direction, a second driven bevel gear mounted on said second drive shaft, a second drive bevel gear meshing with said second driven bevel gear for rotating said second shaft at variable speeds in the other direction, a second differential rotatably mounted in said transmission housing and comprising a second differential housing having a second toothed member affixed to said second differential housing perpendicular to the axis of rotation thereof and engaging said toothed member of said first differential housing.

2. A variable speed drive comprising a rotatable housing, an output toothed member rotatable with said housing, an idler shaft carried by said housing perpendicular to an axis of rotation of said housing and said output toothed member, a first bevel gear rotatably mounted on said idler shaft, a second bevel gear rotatably mounted on said idler shaft, a first drive shaft extending into an end of said housing on the axis of rotation of said housing, a second drive shaft extending into an opposite end of said housing on the axis of rotation of said housing and alinged with said first shaft, a third bevel gear affixed to said first shaft in said housing and meshing with said first and second bevel gears, a fourth bevel gear affixed to said second shaft in said housing and meshing with said first and second bevel gears, first means for rotating said first shaft in one direction, said first means comprising a first drive bevel gear mounted on said first shaft and a first drive bevel gear meshing with said first driven bevel gear, and second means for rotating said second shaft at different speeds in a direction opposite to the direction of rotation of said first shaft to cause said housing to rotate and drive said toothed member, said second means comprising a second driven bevel gear mounted on said second shaft and a second drive bevel gear meshing with said second driven bevel gear.

3. A variable speed drive according to claim 2 characterized by a driven differential having a ring gear engaged with said toothed member.

4. A variable speed drive according to claim 2 characterized by said second means for rotating said second shaft rotates said second shaft at a range of speeds, with the slowest speed being slower than the speed at which said first shaft is rotated and the fastest speed being faster than the speed at which said first shaft is rotated.

5. A variable speed drive comprising a housing, a first drive shaft extending into said housing, means rotatably supporting a portion of said shaft which is spaced from said housing, a second drive shaft aligned with said first shaft and extending into said housing, means rotatably supporting a portion of said second shaft which is spaced from each housing, an output toothed member affixed to said housing in a position perpendicularly to the axes of said first and second shafts and rotatable with said housing, a first bevel gear in said housing affixed to said first drive shaft, a second bevel gear in said housing affixed to said second drive shaft, an idler shaft in said housing positioned perpendicularly to the axes of said first and second shafts, idler bevel gears rotatably mounted on said idler shaft and meshing with said first and second gears, first drive means for rotating said first shaft in one direction, and first drive means comprising a first driven bevel gear and a first drive bevel gear, and second drive means for rotating said second shaft at variable speeds in the other direction, said second drive means comprising a second driven bevel gear and a second drive bevel gear.

6. A variable speed drive according to claim 5 characterized by said first drive means rotating said first shaft at a substantially constant speed.

7. A variable speed drive according to claim 5 characterized by said second means comprising a variable speed pulley, a spring-loaded pulley, and a belt connecting said pulleys.

8. A variable speed drive according to claim 5 characterized by said first driven bevel gear being mounted on said first shaft and said second driven bevel gear being mounted on said second shaft.

9. A variable speed drive according to claim 5 characterized by a driven differential having a ring gear engaged with said toothed member.

* * * * *